United States Patent
Liu et al.

(10) Patent No.: US 12,277,721 B2
(45) Date of Patent: Apr. 15, 2025

(54) METHOD FOR OPTIMIZING DEPTH ESTIMATION MODEL, COMPUTER DEVICE, AND STORAGE MEDIUM

(71) Applicant: HON HAI PRECISION INDUSTRY CO., LTD., New Taipei (TW)

(72) Inventors: Tsung-Wei Liu, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 490 days.

(21) Appl. No.: 17/896,835

(22) Filed: Aug. 26, 2022

(65) Prior Publication Data

US 2023/0410338 A1   Dec. 21, 2023

(30) Foreign Application Priority Data

May 31, 2022   (CN) .......................... 202210616086.5

(51) Int. Cl.
*G06V 10/776*   (2022.01)
*G01S 13/86*   (2006.01)
*G06T 7/55*   (2017.01)
*G06T 7/73*   (2017.01)

(52) U.S. Cl.
CPC ............. *G06T 7/55* (2017.01); *G01S 13/867* (2013.01); *G06T 7/74* (2017.01); *G06V 10/776* (2022.01); *G06T 2207/10016* (2013.01); *G06T 2207/10028* (2013.01); *G06T 2207/20081* (2013.01); *G06T 2207/20084* (2013.01); *G06T 2207/30244* (2013.01)

(58) Field of Classification Search
CPC ... G06T 7/55; G06T 7/74; G06T 2207/10016; G06T 2207/10028; G06T 2207/20081; G06T 2207/20084; G06T 2207/30244; G06T 7/73; G01S 13/867; G06V 10/776; G06V 20/56; G06V 10/761; G06V 10/82; G06V 20/46; G06V 10/757; Y02T 10/40
See application file for complete search history.

(56) References Cited

U.S. PATENT DOCUMENTS

| | | | |
|---|---|---|---|
| 10,699,421 B1* | 6/2020 | Cherevatsky | G06F 18/2113 |
| 2018/0253909 A1* | 9/2018 | Chen | G06T 7/344 |
| 2021/0150726 A1* | 5/2021 | Kao | G06T 7/168 |
| 2021/0319578 A1* | 10/2021 | Casser | G06N 3/088 |
| 2023/0085384 A1* | 3/2023 | Lütgehetmann | G06T 7/74 382/103 |

FOREIGN PATENT DOCUMENTS

| | | |
|---|---|---|
| CN | 114332214 | 4/2022 |
| TW | 202109458 | 3/2021 |

* cited by examiner

*Primary Examiner* — Xuemei G Chen
*Assistant Examiner* — Han Hoang
(74) *Attorney, Agent, or Firm* — ScienBiziP, P.C.

(57) ABSTRACT

This application provides a method for optimizing a depth estimation model. The method includes obtaining a video of an object and capturing a first image and a second image from the video. An initial depth estimation model is obtained. An updated depth estimation model is obtained by performing an optimization process on the initial depth estimation model, and the optimization process is repeatedly performed on the updated depth estimation model. Once the updated depth estimation model meets predetermined requirements, the updated depth estimation model meeting predetermined requirements is determined as a target depth estimation model.

20 Claims, 3 Drawing Sheets

METHOD FOR OPTIMIZING DEPTH ESTIMATION MODEL, COMPUTER DEVICE, AND STORAGE MEDIUM

FIELD

The present disclosure relates to image processing technologies, in particular to a method for optimizing a depth estimation model, a computer device, and a storage medium.

BACKGROUND

Generally, a distance between an object and a camera device can be determined according to a depth image corresponding to an image of the object that is captured by the camera device. However, because it is difficult to obtain accurate depth information using current machine learning algorithms, an error between a predicted distance and an actual distance exists.

DETAILED DESCRIPTION

In order to provide a more clear understanding of the objects, features, and advantages of the present disclosure, the same are given with reference to the drawings and specific embodiments. It should be noted that the embodiments in the present disclosure and the features in the embodiments may be combined with each other without conflict.

In the following description, numerous specific details are set forth in order to provide a full understanding of the present disclosure. The present disclosure may be practiced otherwise than as described herein. The following specific embodiments are not to limit the scope of the present disclosure.

Unless defined otherwise, all technical and scientific terms herein have the same meaning as used in the field of the art technology as generally understood. The terms used in the present disclosure are for the purposes of describing particular embodiments and are not intended to limit the present disclosure.

At block S1, the computer device obtains a video of an object, and captures a first image and a second image from the video.

In one embodiment, obtaining the video of the object, and capturing the first image and the second image from the video includes: taking the video of the object by using a camera device (e.g., a monocular camera device); obtaining the video from the camera device; obtaining two image frames from the video; setting the two image frames respectively as the first image and the second image, wherein the two image frames correspond to different viewing angles of the object, and the two image frames are consecutive frames of the video.

In the embodiment, a size of the first image and a size of the second image are the same.

At block S2, the computer device obtains an initial depth estimation model, and obtains an updated depth estimation model by performing an optimization process on the initial depth estimation model.

In one embodiment, the obtaining of the initial depth estimation model includes: obtaining a preset number of images as initial sample images; obtaining target sample images by performing image preprocessing on each of the initial sample images; obtaining the initial depth estimation model by training a depth estimation neural network using the target sample images based on an existing training method. In one embodiment, the preset number may be, for example, 30,000; the image preprocessing may include, but is not limited to, size adjustment, grayscale adjustment, etc.; the existing training method may be an unsupervised deep learning method; the depth estimation neural network may be a convolutional neural network such as ResNet50, VGG16.

In other embodiments, the computer device may also use conventional machine learning methods or the like to train the initial depth estimation model.

Figure 2:
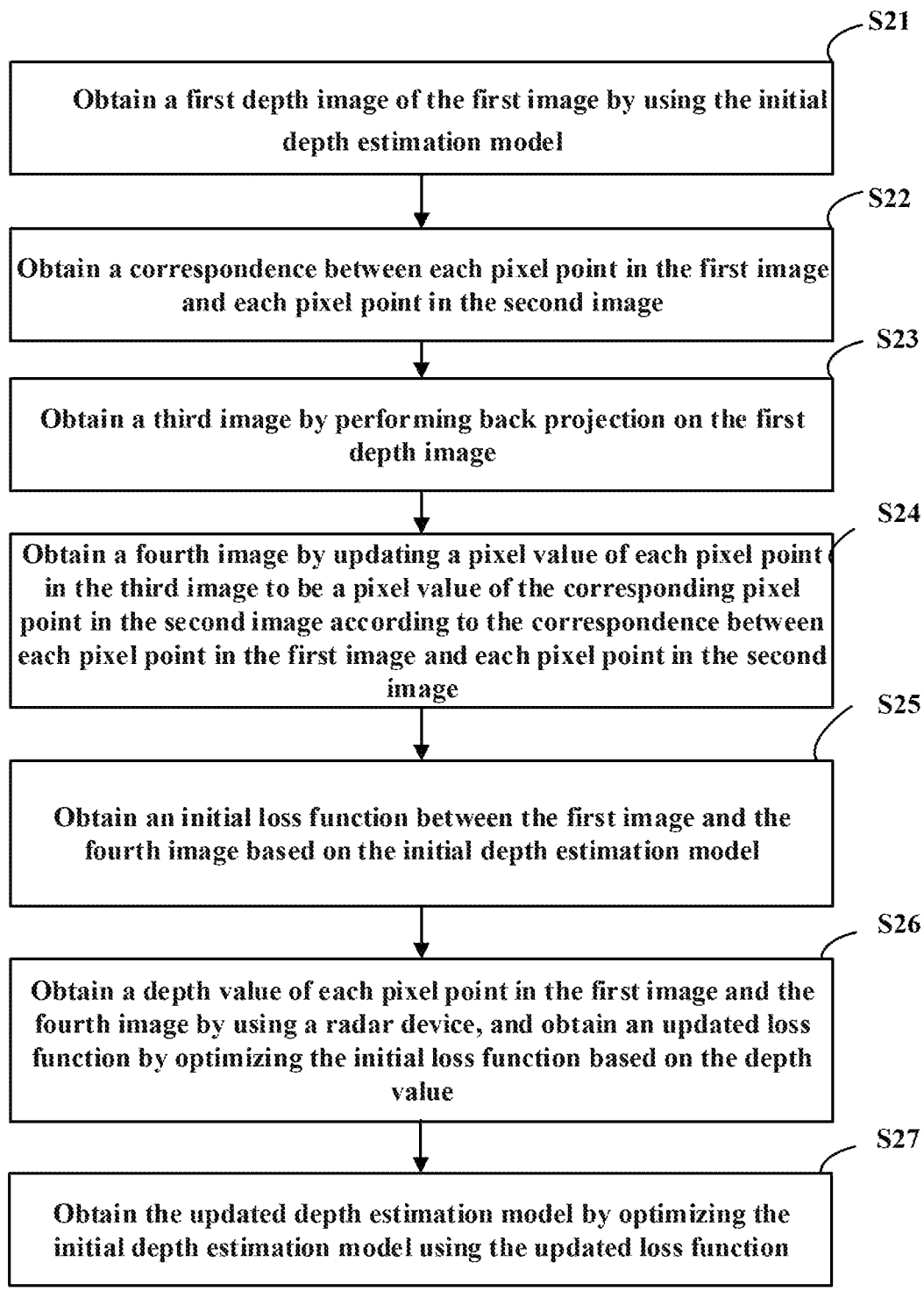
FIG. 2 is a flowchart of an optimization process provided by one embodiment of the present disclosure.

In one embodiment, as shown in FIG. 2, the obtaining of the updated depth estimation model by performing the optimization process on the initial depth estimation model includes blocks S21 to S27.

At block S21, the computer device obtains a depth image (hereinafter named as "first depth image") of the first image by using the initial depth estimation model.

In one embodiment, the computer device obtains the first depth image by inputting the first image into the initial depth estimation model.

In one embodiment, a depth image is also referred to as a ranging image. For example, a pixel value of any one pixel point in the first depth image represents a depth, and the depth represents a distance from the object corresponding to the any one pixel point to the camera device.

In one embodiment, the first depth image may further include a three-dimensional point cloud image.

At block S22, the computer device obtains a correspondence between each pixel point in the first image and each pixel point in the second image.

In one embodiment, the obtaining of the correspondence between each pixel point in the first image and each pixel point in the second image includes: calculating a pose transformation relationship between the first image and the second image; and calculating the correspondence between each pixel point in the first image and each pixel point in the second image according to the pose transformation relationship.

In one embodiment, the computer device calculates the pose transformation relationship between the first image and the second image based on simultaneous localization and mapping (SLAM), including:

Obtaining a preset number of pairs (for example, 10 pairs) of matching points by using an image feature point detection algorithm (for example, Harris corner point algorithm) and an image feature matching algorithm (for example, a scale-invariant feature transformation matching algorithm), each pair of matching points including a feature point in the first image and a corresponding feature point in the second image;

Obtaining three-dimensional space coordinates of each feature point in the first image and obtaining three-dimensional space coordinates of each feature point in the second image, using a triangulation method based on each of the preset number of pairs of matching points;

Calculating a first pose when the camera device captures the first image by using a perspective-n-point algorithm based on the three-dimensional space coordinates of each feature point in the first image; and calculating a second pose when the camera device captures the second image by using the perspective-n-point algorithm based on the three-dimensional space coordinates of each feature point in the second image; and Calculating the pose transformation relationship between the first image and the second image according to the first pose and the second pose.

In one embodiment, each of the first pose and the second pose includes position and pose of the camera device, that is, the orientation of the camera in relation to the object. The pose transformation relationship represents a transformation relationship between a world coordinate system and a camera coordinate system of the camera device. The pose transformation relationship includes a transformation matrix between the first pose and the second pose.

In one embodiment, the calculating of the pose transformation relationship between the first image and the second image according to the first pose and the second pose includes: obtaining transformed three-dimensional space coordinates by multiplying three-dimensional space coordinates of any one pixel point in the first image by the transformation matrix; taking a pixel point in the second image corresponding to the transformed three-dimensional space coordinates as a corresponding pixel point of the any one pixel point in the first image, such that the corresponding pixel point of each pixel point in the first image is determined.

In one embodiment, the computer device may also obtain a pose estimation model by training a convolutional neural network use the method of block S22.

At block S23, the computer device obtains a third image by performing a back projection on the first depth image.

In one embodiment, the computer device may use an openCV program to perform the back projection on the first depth image to obtain the third image.

At block S24, the computer device obtains a fourth image by updating the pixel value of each pixel point in the third image to be the pixel value of the corresponding pixel point in the second image according to the correspondence between each pixel point in the first image and each pixel point in the second image.

At block S25, the computer device obtains an initial loss function between the first image and the fourth image based on the initial depth estimation model.

In one embodiment, the obtaining of the initial loss function between the first image and the fourth image based on the initial depth estimation model includes:

Obtaining a depth image (hereinafter named as "fourth depth image") of the fourth image by inputting the fourth image into the initial depth estimation model; calculating an initial depth difference value between corresponding pixel points in the first depth image and the fourth depth image; establishing the initial loss function based on the initial depth difference value, the initial loss function includes structural similarity (SSIM) of the first depth image and the fourth depth image.

In one embodiment, the initial loss function may further include: L1 norm of pixel difference value (i.e., the initial depth difference value) between the corresponding pixel points in the first depth image and the fourth depth image, cross-entropy loss function, etc.

At block S26, the computer device obtains a depth value of each pixel point in the first image and the fourth image by using a radar device, and obtains an updated loss function by optimizing the initial loss function based on the depth value.

In one embodiment, the "obtains a depth value of each pixel point in the first image and the fourth image by using a radar device, and obtains an updated loss function by optimizing the initial loss function based on the depth value" includes: calculating a depth difference value between each pixel point in the first image and the corresponding pixel point in the fourth image based on the depth value of each pixel point in the first image and the fourth image obtained by using the radar device, and taking the calculated depth difference value as a calibrated depth difference value; and optimizing the initial loss function by setting the calibrated depth difference value as a optimization target of the initial loss function, including: optimizing the initial loss function by using a stochastic gradient descent method based on a chain rule of derivation according to the optimization target.

In one embodiment, the depth values obtained by using the radar device may be used to calibrate depth values of a region with a low texture in the first image and the fourth image, so as to improve the accuracy of detecting the depth values of the region with low texture.

At block S27, the computer device obtains an updated depth estimation model by optimizing the initial depth estimation model using the updated loss function.

At block S3, the computer device repeatedly performs the optimization process on the updated depth estimation model until the updated depth estimation model meeting predetermined requirements, and determines the updated depth estimation model that meets the predetermined requirements as the target depth estimation model.

In one embodiment, the process of optimizing the loss function is the process of optimizing the updated depth estimation model. When the updated loss function converges to a preset threshold range (for example, less than or equal to 0.2), the electronic device determines that the updated depth estimation model meets the predetermined requirements.

The depth estimation model optimization method provided by the present disclosure uses accurate depth information obtained by the radar device to optimize and iterate the loss function of the initial depth estimation model, and the obtained target depth estimation model can improve the accuracy of detecting the distance between an object and a camera device.

Figure 3:
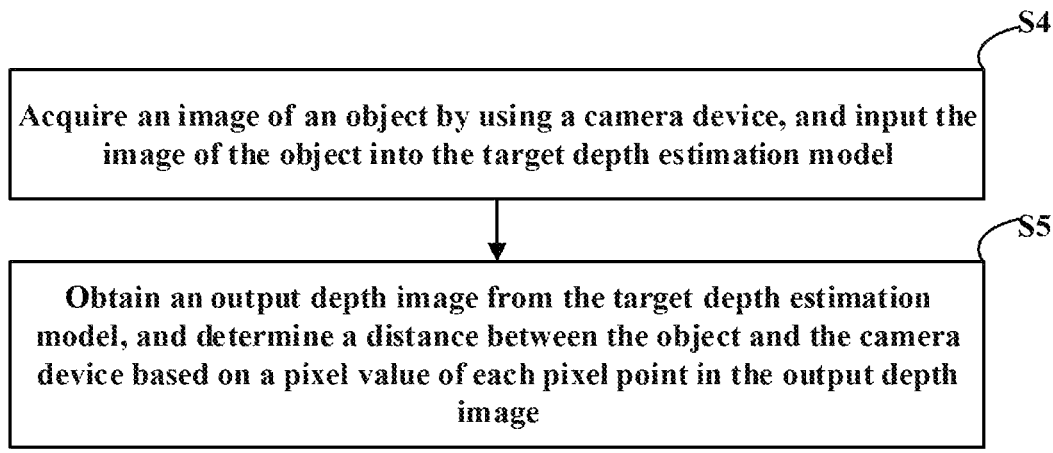
FIG. 3 is a flowchart of a method for detecting a distance to an object provided by one embodiment of the present disclosure.

FIG. 3 illustrates a flowchart of a method for detecting a distance to an object according to one embodiment of the present disclosure.

In this embodiment, by using the target depth estimation model obtained by the depth estimation model optimization method, the distance to the object can be detected. In practical applications, the detection of the distance to the object can be applied in various scenarios, such as intelligent driving, home automation (e.g., housekeeping robot) and so on.

As shown in FIG. 3, the method for detecting a distance to an object includes the following blocks. According to different requirements, an order of the blocks in the flowchart can be changed, and some blocks can be omitted. The execution body of the method can be an electronic device, the electronic device can be a vehicle-mounted device, a sweeping robot, or other suitable device.

At block S4, the electronic device acquires an image of an object by using a camera device, and inputs the image of the object into the target depth estimation model.

In one embodiment, the camera device can be installed in a vehicle or other device that needs to detect the distance to objects.

At block S5, the electronic device obtains an output depth image from the target depth estimation model, and determines a distance between the object and the camera device based on a pixel value of each pixel point in the output depth image.

The object distance detection method provided by the present disclosure can improve the accuracy of detecting the distance to the object by using the target depth estimation model. Such that when the object distance detection method is applied in the field of intelligent driving, by detecting the distance from objects on the road during driving, the safety of the user when driving the vehicle can be improved.

Further, in other embodiments, after the distance between the object and the camera device is determined, the distance may also be compared with a preset distance threshold. If the distance is less than or equal to the preset distance threshold, the electronic device outputs prompt information. For example, if applied in the field of intelligent driving, when the distance is less than or equal to the preset distance threshold, not only can a prompt be issued, through voice or other means, but also deceleration can be performed on the vehicle, for example, controlling the vehicle to gradually slow down in a preset period of time until the vehicle stops within the distance.

Figure 1:
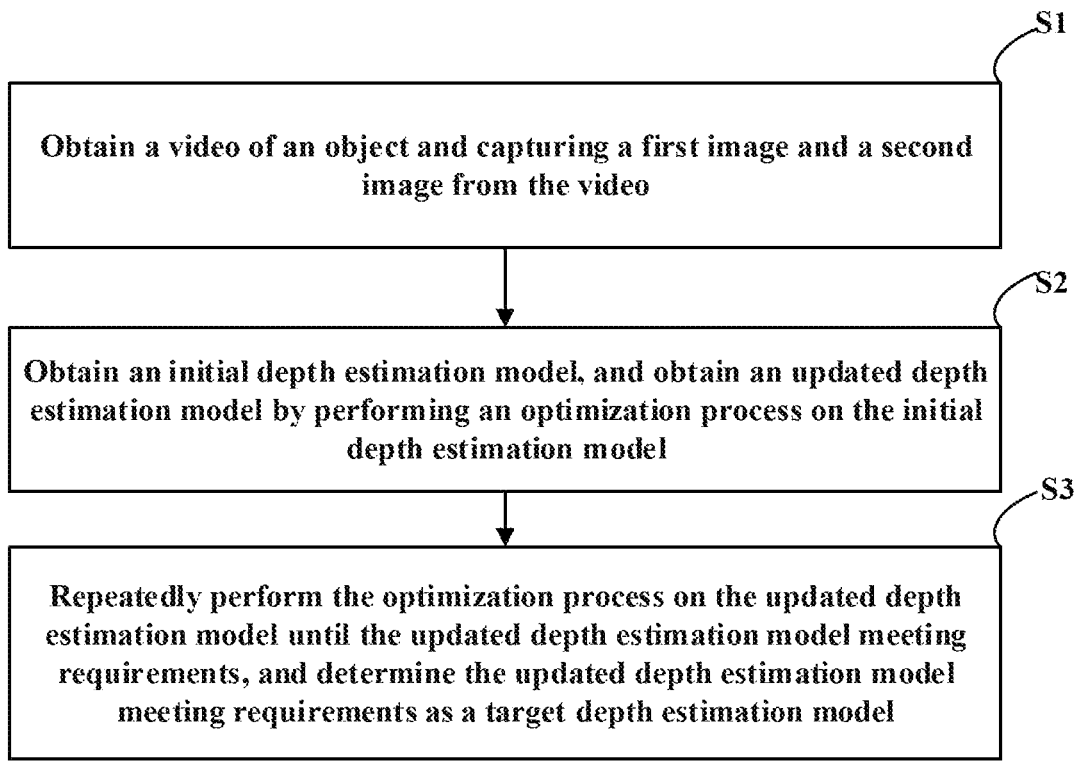
FIG. 1 is a flowchart of a method for optimizing a depth estimation model provided by one embodiment of the present disclosure.

FIG. 1 describes in detail the method for optimizing the depth estimation model of the present disclosure. Hardware architecture that implements the method for optimizing depth estimation model is described in conjunction with FIG. 4.

It should be understood that the described embodiments are for illustrative purposes only, and are not limited by this structure in the scope of the claims.

Figure 4:
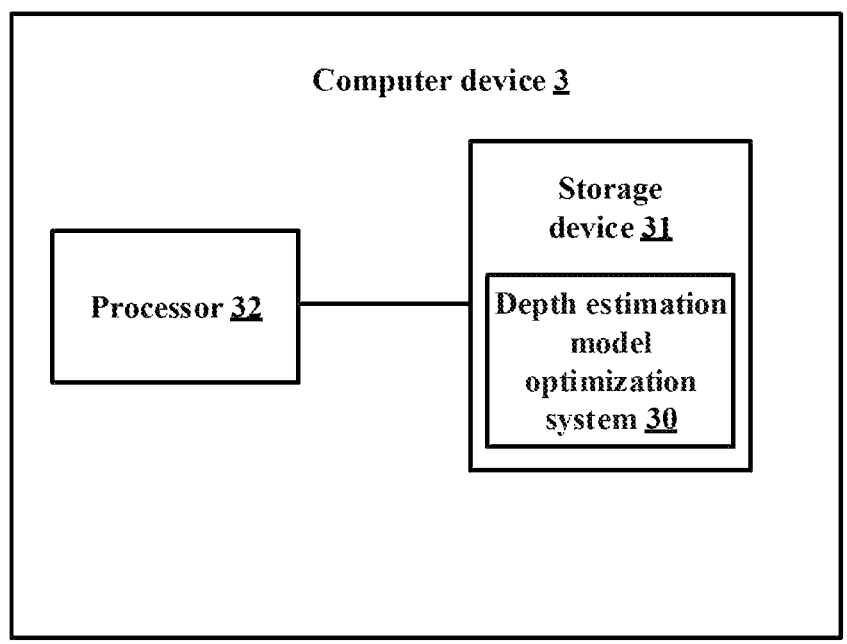
FIG. 4 is a structural diagram of a computer device provided by one embodiment of the present disclosure.

FIG. 4 is a block diagram of a computer device provided by the present disclosure. The computer device 3 may include a storage device 31 and at least one processor 32. It should be understood by those skilled in the art that the structure of the computer device 3 shown in FIG. 4 does not constitute a limitation of the embodiment of the present disclosure. The computer device 3 may further include other hardware or software, or the computer device 3 may have different component arrangements.

In at least one embodiment, the computer device 3 may include a terminal that is capable of automatically performing numerical calculations and/or information processing in accordance with pre-set or stored instructions. The hardware of terminal can include, but is not limited to, a microprocessor, an application specific integrated circuit, programmable gate arrays, digital processors, and embedded devices.

It should be noted that the computer device 3 is merely an example, and other existing or future electronic products may be included in the scope of the present disclosure, and are included in the reference.

In some embodiments, the storage device 31 can be used to store program codes of computer readable programs and various data, such as a depth estimation model optimization system 30 installed in the computer device 3, and automatically access the programs or data with high speed during the running of the computer device 3. The storage device 31 can include a read-only memory (ROM), a random access memory (RAM), a programmable read-only memory (PROM), an erasable programmable read only memory (EPROM), an one-time programmable read-only memory (OTPROM), an electronically-erasable programmable read-only memory (EEPROM)), a compact disc read-only memory (CD-ROM), or other optical disk storage, magnetic disk storage, magnetic tape storage, or any other storage medium readable by the computer device 3 that can be used to carry or store data.

In some embodiments, the at least one processor 32 may be composed of an integrated circuit, for example, may be composed of a single packaged integrated circuit, or multiple integrated circuits of same function or different functions. The at least one processor 32 can include one or more central processing units (CPU), a microprocessor, a digital processing chip, a graphics processor, and various control chips. The at least one processor 32 is a control unit of the computer device 3, which connects various components of the computer device 3 using various interfaces and lines. By running or executing a computer program or modules stored in the storage device 31, and by invoking the data stored in the storage device 31, the at least one processor 32 can perform various functions of the computer device 3 and process data of the computer device 3. For example, the processor 32 may perform the function of optimizing a depth estimation model shown in FIG. 1.

In some embodiments, the depth estimation model optimization system 30 operates in computer device 3. The depth estimation model optimization system 30 may include a plurality of functional modules composed of program code segments. The program code of each program segment in the depth estimation model optimization system 30 can be stored in storage device 31 of the computer device 3 and executed by at least one processor 32 to achieve blocks as shown in FIG. 1.

In this embodiment, the depth estimation model optimization system 30 can be divided into a plurality of functional modules. The module means a series of computer program segments that can be executed by at least one processor 32 and perform fixed functions and are stored in storage device 31.

The program codes are stored in storage device 31 and at least one processor 32 may invoke the program codes stored in storage device 31 to perform the related function. The program codes stored in the storage device 31 can be executed by at least one processor 32, so as to realize the function of each module to achieve the purpose of optimizing the depth estimation model as shown in FIG. 1.

In one embodiment of this application, said storage device 31 stores at least one instruction, and said at least one instruction is executed by said at least one processor 32 for the purpose of optimizing the depth estimation model as shown in FIG. 1.

Although not shown, the computer device 3 may further include a power supply (such as a battery) for powering various components. Preferably, the power supply may be logically connected to the at least one processor 32 through a power management device, thereby, the power management device manages functions such as charging, discharging, and power management. The power supply may include one or more DC or AC power sources, a recharging device, a power failure detection circuit, a power converter or inverter, a power status indicator, and the like. The computer device 3 may further include various sensors, such as a BLUETOOTH module, a WI-FI module, and the like, and details are not described herein.

In the several embodiments provided in this disclosure, it should be understood that the devices and methods disclosed can be implemented by other means. For example, the device embodiments described above are only schematic.

For example, the division of the modules is only a logical function division, which can be implemented in another way.

The modules described as separate parts may or may not be physically separate, and the parts displayed as modules may or may not be physical units, that is, may be located in one place, or may be distributed over multiple network units. Part or all of the modules can be selected according to the actual needs to achieve the purpose of this embodiment.

In addition, each functional unit in each embodiment of the present disclosure can be integrated into one processing unit, or can be physically present separately in each unit, or two or more units can be integrated into one unit. The above integrated unit can be implemented in a form of hardware or in a form of a software functional unit.

The above integrated modules implemented in the form of function modules may be stored in a storage medium. The above function modules may be stored in a storage medium, and include several instructions to enable a computing device (which may be a personal computer, server, or network device, etc.) or processor to execute the method described in the embodiment of the present disclosure.

The present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim. Furthermore, the word "comprising" does not exclude other units nor does the singular exclude the plural. A plurality of units or devices stated in the system claims may also be implemented by one unit or device through software or hardware. Words such as "first" and "second" are used to indicate names but not to signify any particular order.

The above description is only embodiments of the present disclosure and is not intended to limit the present disclosure, and various modifications and changes can be made to the present disclosure. Any modifications, equivalent substitutions, improvements, etc. made within the spirit and scope of the present disclosure are intended to be included within the scope of the present disclosure.

What is claimed is:

1. A method for optimizing a depth estimation model applied to a computer device, the method comprising:
    obtaining a video of an object and capturing a first image and a second image from the video;
    obtaining an initial depth estimation model, and obtaining an updated depth estimation model by performing an optimization process on the initial depth estimation model; and
    repeatedly performing the optimization process on the updated depth estimation model until the updated depth estimation model meets predetermined requirements, and determining the updated depth estimation model that meets the predetermined requirements as a target depth estimation model;
    wherein the optimization process on the initial depth estimation model comprises:
    obtaining a first depth image of the first image by using the initial depth estimation model;
    obtaining a correspondence between each pixel point in the first image and each pixel point in the second image;
    obtaining a third image by performing a back projection on the first depth image;
    obtaining a fourth image by updating a pixel value of each pixel point in the third image to be a pixel value of the corresponding pixel point in the second image according to the correspondence between each pixel point in the first image and each pixel point in the second image;
    obtaining an initial loss function between the first image and the fourth image based on the initial depth estimation model;
    obtaining a depth value of each pixel point in the first image and the fourth image by using a radar device, and obtaining an updated loss function by optimizing the initial loss function based on the depth value; and
    obtaining the updated depth estimation model by optimizing the initial depth estimation model using the updated loss function.

2. The method according to claim 1, wherein obtaining the video of the object and capturing the first image and the second image from the video comprises:
    taking the video of the object using a camera device;
    obtaining the video from the camera device;
    obtaining two image frames from the video;
    setting the two image frames as the first image and the second image, the two image frames corresponding to different viewing angles of the object.

3. The method according to claim 1, wherein obtaining of the correspondence between each pixel point in the first image and each pixel point in the second image comprises:
    calculating a pose transformation relationship between the first image and the second image; and
    calculating the correspondence between each pixel point in the first mage and each pixel point in the second image according to the pose transformation relationship.

4. The method according to claim 3, wherein calculating of the pose transformation relationship between the first image and the second image comprises:
    obtaining a preset number of pairs of matching points by using an image feature point detection algorithm and an image feature matching algorithm, each pair of matching points comprising a feature point in the first image and a corresponding feature point in the second image;
    obtaining three-dimensional space coordinates of each feature point in the first image and obtaining three-dimensional space coordinates of each feature point in the second image, by using a triangulation method based on each of the preset number of pairs of matching points;
    calculating a first pose when the camera device captures the first image by using a perspective-n-point algorithm based on the three-dimensional space coordinates of each feature point in the first image; and calculating a second pose when the camera device captures the second image by using the perspective-n-point algorithm based on the three-dimensional space coordinates of each feature point in the second image; and
    calculating the pose transformation relationship between the first image and the second image according to the first pose and the second pose.

5. The method according to claim 1, wherein obtaining of the initial loss function between the first image and the fourth image based on the initial depth estimation model comprises:

obtaining a fourth depth image of the fourth image by inputting the fourth image into the initial depth estimation model;

calculating an initial depth difference value between corresponding pixel points in the first depth image and the fourth depth image;

establishing the initial loss function based on the initial depth difference value, the initial loss function comprising structural similarity of the first depth image and the fourth depth image.

6. The method according to claim 5, wherein obtaining of the depth value of each pixel point in the first image and the fourth image by using the radar device, and the obtaining of the updated loss function by optimizing the initial loss function based on the depth value comprises:

calculating a depth difference value between each pixel point in the first image and the corresponding pixel point in the fourth image, based on the depth value of each pixel point in the first image and the fourth image obtained by using the radar device, and taking the calculated depth difference value as a calibrated depth difference value; and optimizing the initial loss function by setting the calibrated depth difference value as an optimization target of the initial loss function.

7. The method according to claim 1, further comprising:
in response that the updated loss function converges to a preset threshold range, determining that the updated depth estimation model meets the requirements.

8. A computer device comprising:
a storage device;
at least one processor; and
the storage device storing one or more programs, which when executed by the at least one processor, cause the at least one processor to:
obtain a video of an object and capturing a first image and a second image from the video;
obtain an initial depth estimation model, and obtain an updated depth estimation model by perforating an optimization process on the initial depth estimation model; and
repeatedly perform the optimization process on the updated depth estimation model until the updated depth estimation model meets predetermined requirements, and determine the updated depth estimation model that meets the predetermined requirements as a target depth estimation model;
wherein the optimization process on the initial depth estimation model comprises:
obtaining a first depth image of the first image by using the initial depth estimation model;
obtaining a correspondence between each pixel point in the first image and each pixel point in the second image;
obtaining a third image by performing a back projection on the first depth image;
obtaining a fourth image by updating a pixel value of each pixel point in the third image to be a pixel value of the corresponding pixel point in the second image according to the correspondence between each pixel point in the first image and each pixel point in the second image;

obtaining an initial loss function between the first image and the fourth image based on the initial depth estimation model;

obtaining a depth value of each pixel point in the first image and the fourth image by using a radar device, and obtaining an updated loss function by optimizing the initial loss function based on the depth value; and obtaining the updated depth estimation model by optimizing the initial depth estimation model using the updated loss function.

9. The computer device according to claim 8, wherein the at least one processor obtains the video of the object and captures the first image and the second image from the video by:

taking the video of the object using a camera device;
obtaining the video from the camera device;
obtaining two image frames from the video;
setting the two image frames as the first image and the second image, the two image frames corresponding to different viewing angles of the object.

10. The computer device according to claim 8, wherein the at least one processor obtains the correspondence between each pixel point in the first image and each pixel point in the second image by:

calculating a pose transformation relationship between the first image and the second image; and calculating the correspondence between each pixel point in the first image and each pixel point in the second image according to the pose transformation relationship.

11. The computer device according to claim 10, wherein the at least one processor calculates the pose transformation relationship between the first image and the second image by:

obtaining a preset number of pairs of matching points by using an image feature point detection algorithm and an image feature matching algorithm, each pair of matching points comprising a feature point in the first image and a corresponding feature point in the second image;

obtaining three-dimensional space coordinates of each feature point in the first image and obtaining three-dimensional space coordinates of each feature point in the second image, by using a triangulation method based on each of the preset number of pairs of matching points;

calculating a first pose when the camera device captures the first image by using a perspective-n-point algorithm based on the three-dimensional space coordinates of each feature point in the first image; and calculating a second pose when the camera device captures the second image by using the perspective-n-point algorithm based on the three-dimensional space coordinates of each feature point in the second image; and calculating the pose transformation relationship between the first image and the second image according to the first pose and the second pose.

12. The computer device according to claim 8, wherein the at least one processor obtains the initial loss function between the first image and the fourth image based on the initial depth estimation model by:

obtaining a fourth depth image of the fourth image by inputting the fourth image into the initial depth estimation model;

calculating an initial depth difference value between corresponding pixel points in the first depth image and the fourth depth image;

establishing the initial loss function based on the initial depth difference value, the initial loss function comprising structural similarity of the first depth image and the fourth depth image.

13. The computer device according to claim 12, wherein the at least one processor obtains the depth value of each pixel point in the first image and the fourth image by using the radar device, and obtains the updated loss function by optimizing the initial loss function based on the depth value by:

calculating a depth difference value between each pixel point in the first image and the corresponding pixel point in the fourth image, based on the depth value of each pixel point in the first image and the fourth image obtained by using the radar device, and taking the calculated depth difference value as a calibrated depth difference value; and optimizing the initial loss function by setting the calibrated depth difference value as an optimization target of the initial loss function.

14. The computer device according to claim 8, wherein the at least one processor is further caused to:

in response that the updated loss function converges to a preset threshold range, determine that the updated depth estimation model meets the requirements.

15. A non-transitory storage medium having stored thereon at least one computer-readable instructions, which when executed by a processor of a computer device, causes the processor to perform a method for optimizing a depth estimation model, wherein the method comprises:

obtaining a video of an object and capturing a first image and a second image from the video;

obtaining an initial depth estimation model, and obtaining an updated depth estimation model by performing an optimization process on the initial depth estimation model; and repeatedly performing the optimization process on the updated depth estimation model until the updated depth estimation model meets predetermined requirements, and determining the updated depth estimation model that meets the predetermined requirements as a target depth estimation model;

wherein optimization process on the initial depth estimation model comprises:

obtaining a first depth image of the first image by using the initial depth estimation model;

obtaining a correspondence between each pixel point in the first image and each pixel point in the second image;

obtaining a third image by performing back projection on the first depth image;

obtaining a fourth image by updating a pixel value of each pixel point in the third image to be a pixel value of the corresponding pixel point in the second image according to the correspondence between each pixel point in the first image and each pixel point in the second image;

obtaining an initial loss function between the first image and the fourth image based on the initial depth estimation model;

obtaining a depth value of each pixel point in the first image and the fourth image by using a radar device, and obtaining an updated loss function by optimizing the initial loss function based on the depth value; and obtaining the updated depth estimation model by optimizing the initial depth estimation model using the updated loss function.

16. The non-transitory storage medium according to claim 15, wherein obtaining the video of the object and capturing the first image and the second image from the video comprises:

taking the video of the object using a camera device;
obtaining the video from the camera device;
obtaining two image frames from the video;
setting the two image frames as the first image and the second image, the two image frames corresponding to different viewing angles of the object.

17. The non-transitory storage medium according to claim 15, wherein obtaining of the correspondence between each pixel point in the first image and each pixel point in the second image comprises:

calculating a pose transformation relationship between the first image and the second image; and calculating the correspondence between each pixel point in the first image and each pixel point in the second image according to the pose transformation relationship.

18. The non-transitory storage medium according to claim 17, wherein calculating of the pose transformation relationship between the first image and the second image comprises:

obtaining a preset number of pairs of matching points by using an image feature point detection algorithm and an image feature matching algorithm, each pair of matching points comprising a feature point in the first image and a corresponding feature point in the second image;

obtaining three-dimensional space coordinates of each feature point in the first image and obtaining three-dimensional space coordinates of each feature point in the second image, by using a triangulation method based on each of the preset number of pairs of matching points;

calculating a first pose when the camera device captures the first image by using a perspective-n-point algorithm based on the three-dimensional space coordinates of each feature point in the first image; and calculating a second pose when the camera device captures the second image by using the perspective-n-point algorithm based on the three-dimensional space coordinates of each feature point in the second image; and calculating the pose transformation relationship between the first image and the second image according to the first pose and the second pose.

19. The non-transitory storage medium according to claim 15, wherein obtaining of the initial loss function between the first image and the fourth image based on the initial depth estimation model comprises:

obtaining a fourth depth image of the fourth image by inputting the fourth image into the initial depth estimation model;

calculating an initial depth difference value between corresponding pixel points in the first depth image and the fourth depth image;

establishing the initial loss function based on the initial depth difference value, the initial loss function comprising structural similarity of the first depth image and the fourth depth image.

20. The non-transitory storage medium according to claim 19, wherein obtaining of the depth value of each pixel point in the first image and the fourth image by using the radar device, and the obtaining of the updated loss function by optimizing the initial loss function based on the depth value comprises:

calculating a depth difference value between each pixel point in the first image and the corresponding pixel point in the fourth image, based on the depth value of each pixel point in the first image and the fourth image obtained by using the radar device, and taking the calculated depth difference value as a calibrated depth difference value; and optimizing the initial loss function by setting the calibrated depth difference value as an optimization target of the initial loss function.

* * * * *